Inventor:
Paul Schaich

United States Patent Office 3,335,808
Patented Aug. 15, 1967

3,335,808
STEERING MECHANISMS FOR ROLLERS
Paul Schaich, Munich, Germany, assignor to BOMAG
Bopparder Maschinenbaugesellschaft m.b.H., Boppard
am Rhine, Germany
Filed Sept. 2, 1964, Ser. No. 393,848
Claims priority, application Germany, Sept. 16, 1963,
B 73,536
2 Claims. (Cl. 180—6.5)

ABSTRACT OF THE DISCLOSURE

The details of a steering mechanism for operating two side by side road rollers are disclosed herein. The steering of the road rollers is accomplished by changing the speed of one or both of two side by side rollers which are separately driven from their own power source. Each roller may be rotated through a speed range in either a forward or a reverse direction. The invention provides a steering mechanism which includes a steering column which may be pivoted about a horizontal axis forwardly or backwardly for the purpose of changing the speed, to increase or decrease the speed in accordance with which way the column is moved for each of the rollers. Thus, a simultaneous speeding up or slowing down of each roller is accomplished by changing the speed of its associated driving motor. When a turn is desired, a hand wheel mounted on the column is rotated to effect a rotation of a pivotal double-armed member in order to effect the simultaneous increase in speed of one of the rollers and a decrease in speed of the other of the rollers to effect a turning of the vehicle in the direction of rotation of the steering wheel. The motion from the hand wheel to the double-armed lever is transmitted by a chain which is connected to a sprocket wheel mounted on the axis of the hand wheel and the axis of the double-armed lever and which is guided by a pair of spaced sprockets arranged between the double-armed lever and the hand wheel and which is rotatable about a horizontal axis.

This invention relates in general to steering mechanisms and, in particular, to a new and useful steering device particularly for controlling a vehicle, such as a steam roller, having separately driven side-by-side rollers, by controlling the speed of the rollers in each direction through a single steering device and speed control.

The invention has particular application in respect to the steering and speed control of a vehicle such as a vibration type steam roller which is equipped with separately driven rollers, arranged in pairs transverse to the driving direction, preferably in groups, one behind the other. Vehicles of this nature are usually steered by means of two hand-operated levers which act separately on the speed and direction of rotation of the driving motor of the associated rollers with a steering and speed control of this nature, the vehicle is apt to take a zig-zag course, even when straight driving is desired.

In accordance with the present invention, there is provided a steering and speed control mechanism which permits the rotation of one wheel in a tandem mount and the simultaneous slowing down of the other to effect a steering movement. In addition, the mechanism also permits an increase and decrease in speed in both directions of rotation. In a preferred arrangement, the steering mechanism includes a steering post which is pivotably mounted at one end, preferably to permit pivotal back and forht movement about a substantially horizontal axis on the vehicle with which the mechanism is associated. The steering post advantageously carries lever means such as a double-armed lever for pivotal movement about its center on a vertical axis. The double-armed lever is pivoted upon rotation of a hand wheel, and each end is connected to a respective control for a motor serving a respective driving motor of each wheel or roller in a tandem pair. Changing the speed of both rollers in a tandem pair may be effected by pivoting the post about its horizontal pivot to effect a simultaneous speeding up or slowing down of the motors driving each of the rollers together, in accordance with the direction in which the post is pivoted. When a turn is desired, the wheel is rotated on the steering post to effect a rotation of the pivotal double-armed member in order to effect the simultaneous increase in speed of one of the rollers and a decrease in speed of the other of the rollers, to effect a turning of the vehicle in the direction of rotation of the steering wheel.

Thus, with the invention, an easy steering by changing the speeds of rotation of the inboard or outboard wheels or rollers of the vehicle may be effected in a uniform manner and, in addition, the rollers may be simultaneously increased or decreased in speed in both directions as desired with the steering mechanism.

Accordingly, it is an object of this invention to provide an improved speed control and steering mechanism for a vehicle having at least one set of separately driven tandem wheels or rollers arranged side-by-side in directions transverse to the traveling direction of the vehicle.

A further object of the invention is to provide a steering device and speed control for regulating the speeds of driving motors of wheels or rollers in a vehicle which are mounted in side-by-side manner, which includes simultaneously shiftable lever means or arm members which are adapted to be connected to speed control elements for the respective driving motors of the wheels or rollers, with means connected to the arm members for shifting them together in a same direction for a speed increase or decrease of the rollers and for shifting them in directions opposite from each other for obtaining an increase in one of the control motor speeds and a simultaneous decrease of the other control motor speed for the purpose of effecting a turn of the vehicle.

A further object of the invention is to provide a steering and speed control device which includes a pivotal mounting post mounted for forward and aft pivotal movement with a steering wheel thereon mounted for rotation about a substantially horizontal axis, and a pivotal yoke member or lever member which is pivotal about its center for the shifting of the opposite ends thereof in opposite directions, the steering wheel being connected to the yoke member for effecting the desired pivoting thereof, and the opposite ends of the yoke member being connectable to respective speed control members for varying the speed control in opposite directions simultaneously, the complete steering post with the yoke member being shiftable in forward and aft directions upon pivoting of said post for effecting simultaneous speed control in either increasing or decreasing amounts in each direction.

A further object of the invention is to provide a steering device comprising a steering post having substantially horizontal driving shafts extending outwardly from each side thereof, with a rotatable steering wheel being rotatable to shift the shafts in opposite directions, the shafts being pivotably mounted to permit pivotal up and down movement of said steering post when the shafts are pivoted about a substantially horizontal axis, and with lever members connected to each shaft, being rotatable in opposite directions upon rotation of the steering wheel and in same direction upon rotation of the shafts about their horizontal axis.

A further object of the invention is to provide a steering and speed control device which is simple in design, rugged in construction, and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

Figure 1:
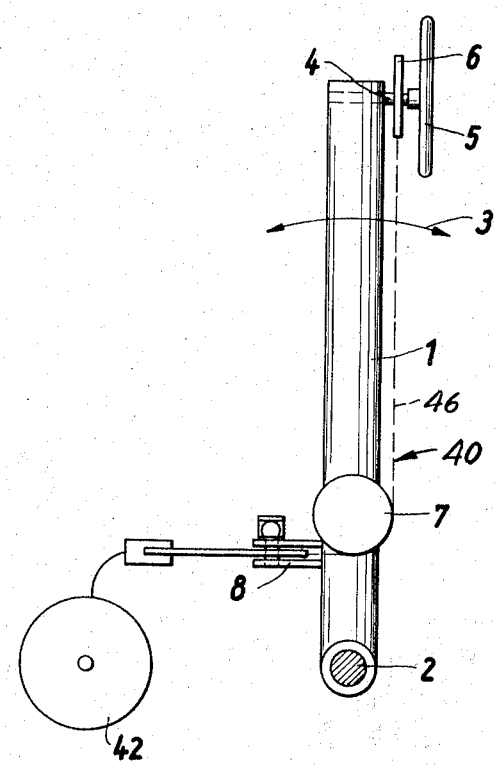
FIG. 1 is a side elevational view of a steering and speed control device constructed in accordance with the invention.
Figure 2:
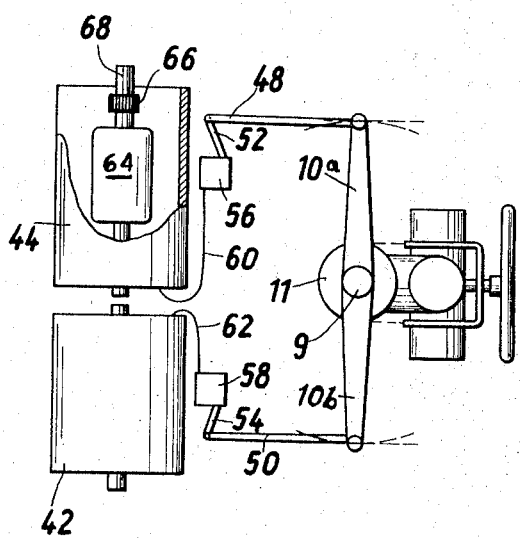
FIG. 2 is a top plan view of a device indicating the connection for regulating the speed of driving motors arranged to separately drive rollers of a tandem pair of rollers in a steam roller.

Referring to the drawings in particular, the invention embodied in FIGS. 1 and 2 comprises a steering and speed control device generally designated 40, which is mounted on a vehicle for controlling the steering and speed of two wheels or rollers 42 and 44 of a vehicle such as a vibration type steam roller. In the embodiment illustrated, the steering and speed control device 40 includes an elongated steering column or post 1 which is pivotably mounted on a journal 2 for pivotal movement about a horizontal axis in the directions indicated by the double arrow 3. A steering wheel shaft 4 is rotatably mounted for rotation about a substantially horizontal axis at the upper axis of the post 1 and it carries a steering wheel 5 at its outer end. A sprocket or chain wheel 6 is affixed to the shaft 4 for rotation therewith, and rotation of the steering wheel causes rotation of the sprocket and movement of a chain 46 which extends therearound and around guide sprockets 7 rotatably mounted on each side of post 1 adjacent the lower end thereof, for rotation about a horizontal axis. The chain 46 is also trained around a sprocket 11 which is affixed to lever means including a shaft 9 which is supported on an extension of the post 1 for rotation about a substantially vertical axis. The shaft 9 carries a double-armed lever or yoke member 10 having arm portions 10a and 10b which are connected via linkage members 48 and 50, respectively, to control levers 52 and 54, respectively, of control members 56 and 58. The control members 56 and 58 in the embodiment illustrated are electrical controls, such as resistant members, for regulating the current through cables 60 and 62 to electrical driving motors 64. One driving motor 64 is provided for each of the rollers 42 and 44 and each includes a shaft having a gear 66 driving through gears on a roller shaft 68 to effect a rotation of the associated roller.

When the post 1 is moved in the direction of the arrows, the linkages 48 and 50 are pulled by the yoke member 10 uniformly forwardly or rearwardly in dependence of which direction the post is moved, to cause a uniform speed change of the driving motors 64 of each of the rollers 42 and 44. When the steering wheel 5 is turned, the chain 46 causes rotation of the sprocket 11 and the yoke member 10 to cause one of the motors 64 to be advanced in speed and the other to be decreased in speed by a proportionate amount by actuating the respective controls 56 and 58 therefor. In this manner, the driver can thus sensitively vary the driving speed of the rollers 42 and 44 in a manner to effect a uniform turning of the rollers of the vehicle.

Figure 3:
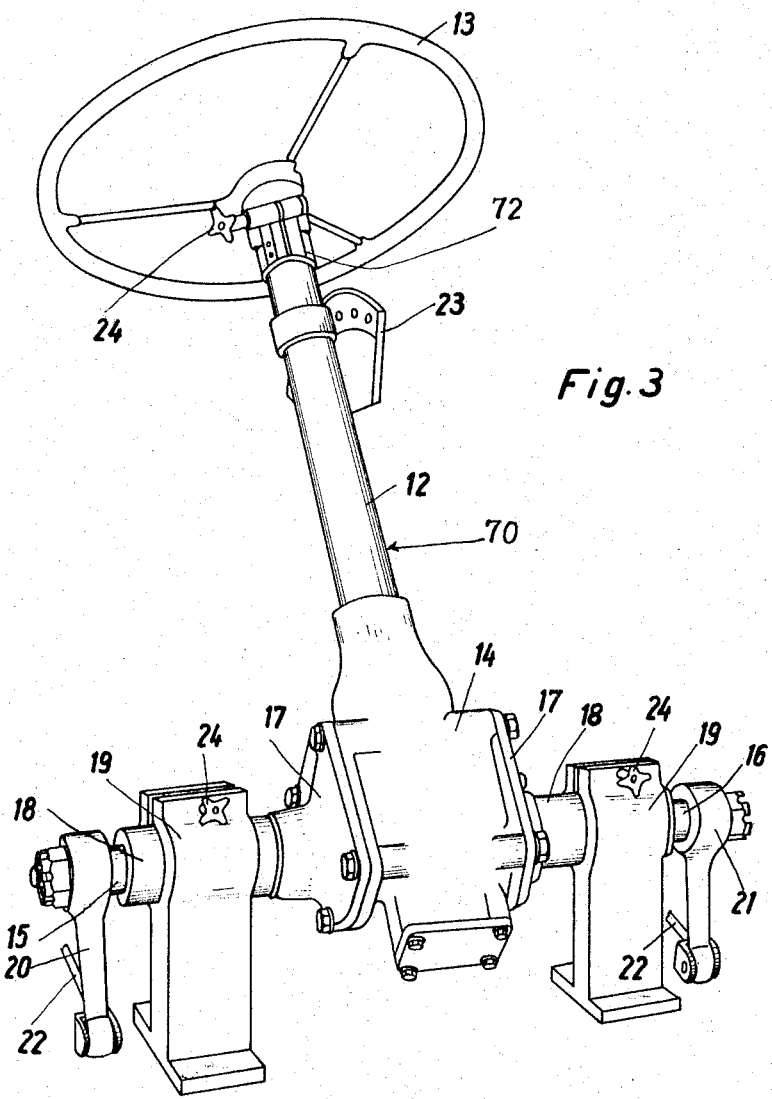
FIG. 3 is a perspective view of another embodiment of the steering and speed control device.

In the embodiment of FIG. 3, there is indicated a combination steering and speed control device generally designated 70 which includes a steering column 12 in which is supported a steering wheel spindle which can be turned by means of a rotatable steering wheel 13. At the lower end of the column 12, there is a column housing 14 which contains known contrarotating transmission gears which act on two shafts 15 and 16 which extend outwardly from opposite sides of the column 14 and rotate in opposite directions in response to rotation of the steering wheel 13. The shafts 15 and 16 are rotatably supported in vertical stands 19, 19 which are mounted on a vehicle (not shown). The transmission housing 14 is provided with covers 17, 17 on each end for rotatably supporting the respective shafts 15 and 16. The outer ends of each of the shafts carry an arm member or lever member 20, for the shaft 15, and 21, for the shaft 16. Control links 22, 22 are pivotably connected to the outer ends of each of the arms 20 and 21 at their one ends and extend at their opposite ends to a control device (not shown) for regulating the speed of an engine separately driving a single wheel in a tandem wheel arrangement on the vehicle, similar to the other embodiment.

As in the other embodiment, the inclination of the steering column 12 may be shifted, in which event the shafts 15 and 16 will rotate in the same direction to cause the control linkages 22 to actuate the controls for speed change in the same proportion and amount for each of the driving engines of the wheels with which the control mechanisms are to be associated. Adjustable means, such as a stationary adjusting segment 23, are provided for supporting the steering column at a desired inclination comparable to the selected speed for the vehicle. The segment 23, for example, may be rotated to provide a varying elevational support for the upper end of the steering wheel, and the change in elevation is selected to achieve the desired speed adjustment over the full range of operation of the driving motors in both forward and reverse directions of rotation.

In the embodiment of FIG. 3, the driving motor for the roller is not indicated, but it may be an electric motor driving through gearing on each wheel, for example, as indicated in the embodiments of FIGS. 1 and 12; or, hydrostatic drives for the wheels or rollers may be provided. The latter type of drives are particularly effective for sensitively controlled transmission gears. The transmission gearing in column housing 14 can be a commercial gear for single wheel steering, which can be equipped with a chain wheel and two segments, or with a right-hand and left-hand worm and right-hand and left-hand following nuts. By means of a combination steering device and speed control mechanism 70, according to the invention it is possible to superimpose any steering movement on the driving speed of the vehicle. This steering movement can be varied by turning the steering column 13 so that the arms 20 and 21 are moved in opposite directions to effect equal but opposite speed variations in the affected wheels, which are connected by control mechanisms through the linkage members 22, 22. By turning the steering wheel 13 in this manner, the affected wheels are thus driven at different speeds to cause a turning movement.

In some instances, it is also desirable to connect the linkage members 22, 22 to means for also affecting a pivotal movement of the respective rollers.

The upper end of the steering column 12 is provided with an encircling band or brake sleeve 72 which may be tightened or loosened by adjustment of a rotatable knob member or handle 24. The band 72 engages the steering spindle connected to the steering wheel 13 and varies the friction which must be overcome for turning the steering column and even permits a locking of the steering wheel 13 in a selected position. In some instances, it is also desirable to provide a pedal for turning the steering column, and in some instances, two pedals are provided for effecting a forward and reverse drive with each respective foot.

While specific embodiments of the invention have been shown and described in detail to illustrate the application of the inventive principles, it will be understood that this invention may be embodied otherwise without departing from such principles.

What is claimed is:

1. A road roller vehicle comprising at least one pair of rollers, a separate axle for each of said rollers, said rollers being arranged in side-by-side manner, motion means for driving said rollers including a separate speed control for each of said rollers, a steering column mounted for pivotal movement about a first axis, a rotatable hand wheel carried on said steering column, first and second lever means extending outwardly from opposite sides of said steering column and being displaceable upon pivoting of said steering column about its first axis along with said steering column, means connected between said hand wheel and said first and second lever means to effect displacement of said first and second lever means in opposite relative directions upon rotation of said hand wheels, and means separately connected to said first lever means and said second lever means for connecting the respective lever means with respective ones of said speed controls for each of said rollers of the vehicle in a pair, whereby when said steering column is pivoted about its first axis, said first and second lever means being moved with said column by the same amount to effect a simultaneous uniform speed change and, when said hand-wheel is rotated, said first and second lever means being moved in opposite directions by proportional amounts to effect speed change of the control means in opposite directions by a proportionate amount, said first and second lever means comprising a double-armed lever member pivotably mounted adjacent its center, said hand-wheel being connected to said double-armed lever member to rotate said lever member in an amount proportional to rotation of said hand-wheel, said hand wheel being rotatable about an axis substantially perpendicular to said first axis, a sprocket wheel rotatable with said hand-wheel about the same axis, a second sprocket wheel set spaced downwardly from said first sprocket wheel toward the first axis of said steering column and rotatable about an axis substantially parallel to the first axis, said double-armed lever being pivotably mounted for rotation about an axis substantially perpendicular to said first axis and being substantially parallel to the vertical axis of the steering column, and a third sprocket wheel rotatable about the same axis as the double-armed lever member and connected to said lever member for rotating the same, and an endless chain extending around said first sprocket and guided over said second sprocket set and around said third sprocket for shifting said double-armed lever in response to rotation of said steering wheel.

2. A road roller vehicle comprising at least one pair of rollers, a separate axle for each of said rollers, said rollers being arranged in side-by-side manner, motion means for driving said rollers including a separate speed control for each of said rollers, a steering column mounted for pivotal movement about a first axis, a rotatable hand-wheel carried on said steering column, first and second lever means extending outwardly from opposite sides of said steering column and being displaceable upon pivoting of said steering column about its first axis along with said steering column, means connected between said hand-wheel and said first and second lever means to effect displacement of said first and second lever means in opposite relative directions upon rotation of said hand-wheel, means separately connected to said first lever means and said second lever means for connecting the respective lever means with respective ones of said speed controls for each of the rollers of said pair, whereby when said steering column is pivoted about its first axis, said first and second lever means are moved with said column by the same amount to effect a simultaneous uniform speed change and, when said hand-wheel is rotated, said first and second lever means are moved in opposite directions by proportional amounts to effect speed change of the control means in opposite directions by a proportionate amount, said first and second lever means comprising rotatable shafts extending outwardly from opposite sides of said steering column, transmission means connected between said steering wheel and said first and second shafts for rotating said first and second shafts in opposite directions upon rotation of said steering wheel, and first and second lever members connected respectively to said first and second shaft members for connecting such shaft members to said speed controls.

References Cited
UNITED STATES PATENTS

| | | | |
|---|---|---|---|
| 644,853 | 3/1900 | Fahl. | |
| 2,778,655 | 1/1957 | Hautzenroeder | 280—93 |
| 3,181,389 | 5/1965 | Richard | 180—6.7 X |
| 3,190,385 | 6/1965 | Allport | 180—77 X |

FOREIGN PATENTS

| | | |
|---|---|---|
| 1,322,845 | 2/1963 | France. |

BENJAMIN HERSH, *Primary Examiner.*

J. A. PEKAR, *Assistant Examiner.*